United States Patent [19]

Takahashi et al.

[11] 4,275,268

[45] Jun. 23, 1981

[54] MIXING APPARATUS

[75] Inventors: Hiroshi Takahashi, Chiba; Etsuo Shibazaki, Musashino; Yoshihito Yamamoto, Yokohama, all of Japan

[73] Assignee: Sony Corporation, Tokyo, Japan

[21] Appl. No.: 58,316

[22] Filed: Jul. 17, 1979

[30] Foreign Application Priority Data

Jul. 20, 1978 [JP] Japan .................................. 53-88547

[51] Int. Cl.³ ............................................ H04M 3/56
[52] U.S. Cl. ............................... 179/1 B; 179/1 CN; 179/1 AT; 179/1 G; 364/606; 364/754
[58] Field of Search ................. 179/1 B, 1 CN, 1 AT, 179/1 D, 1 J, 1 G, 1 GP; 330/124 R, 295; 364/604, 606, 725, 731, 754, 768, 784, 900

[56] References Cited

U.S. PATENT DOCUMENTS

| | | | |
|---|---|---|---|
| 3,763,365 | 10/1973 | Seitz | 364/754 |
| 3,976,981 | 8/1976 | Bowden | 364/900 |
| 4,037,093 | 7/1977 | Gregg et al. | 364/754 |
| 4,056,683 | 11/1977 | Suehiro | 179/1 AT |
| 4,149,032 | 4/1979 | Peters | 179/1 AT |
| 4,163,871 | 8/1979 | Maggi | 179/1 CN |

OTHER PUBLICATIONS

A. Assimus, et al., "Digital Conference Network etc.," IBM Tech. Bull., Mar. 1975, pp. 2967-2969.

*Primary Examiner*—Charles E. Atkinson
*Assistant Examiner*—E. S. Kemeny
*Attorney, Agent, or Firm*—Lewis H. Eslinger; Alvin Sinderbrand

[57] ABSTRACT

A digital signal mixing apparatus for mixing digital signals in S input channels to obtain digital mixed signals in T output channels is provided which includes a memory in which a matrix of S columns by T rows of elements are stored in digital form, a circuit which determines the value of the elements of the S by T matrix in response to a desired mixing ratio between the S-channels of the digital input signals and supplies these matrix elements to the memory, and a circuit which multiplies the digital signals in the S input channels by corresponding matrix elements read out from the memory to generate the digital mixed signals in the T output channels.

11 Claims, 34 Drawing Figures

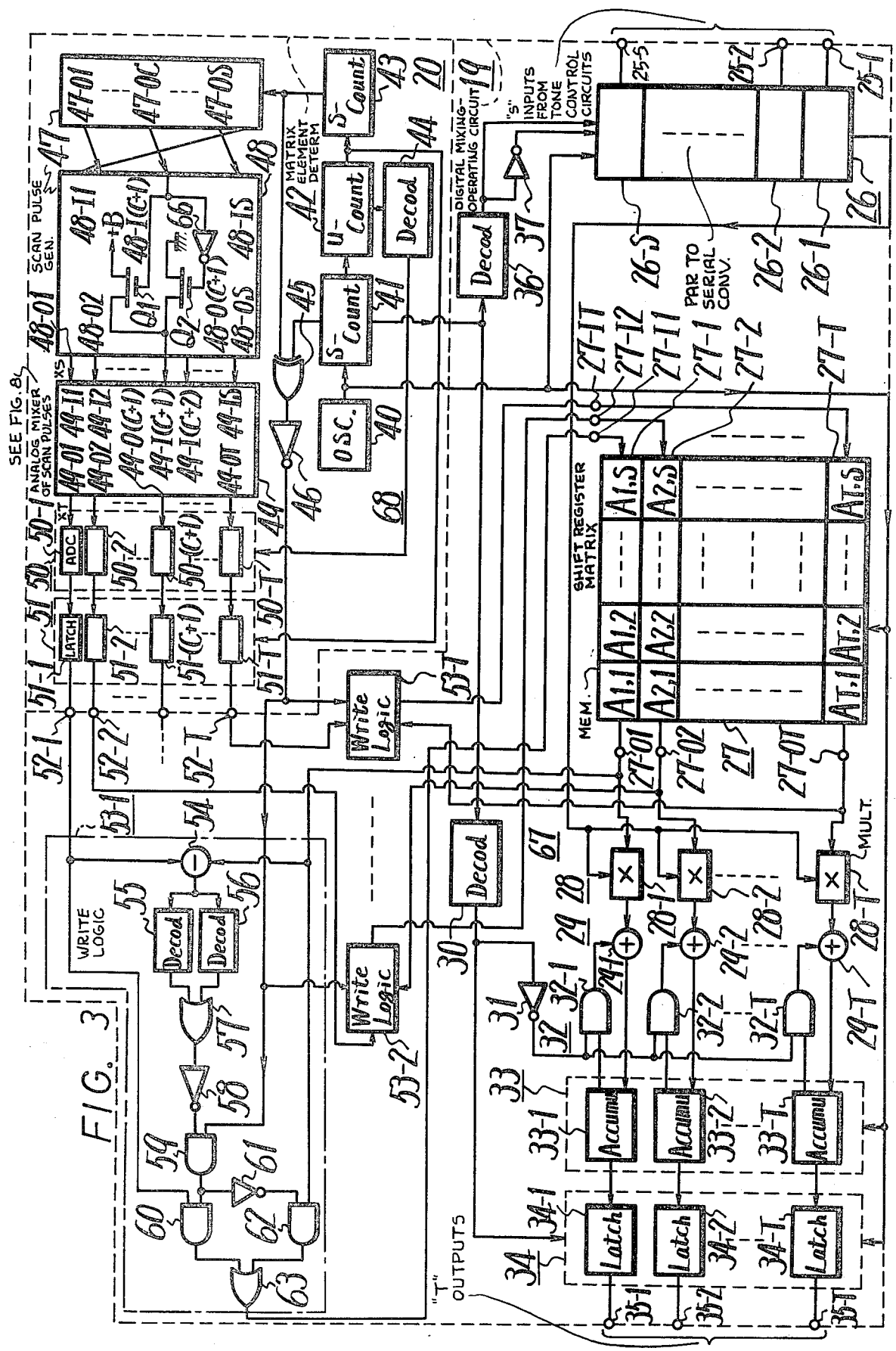

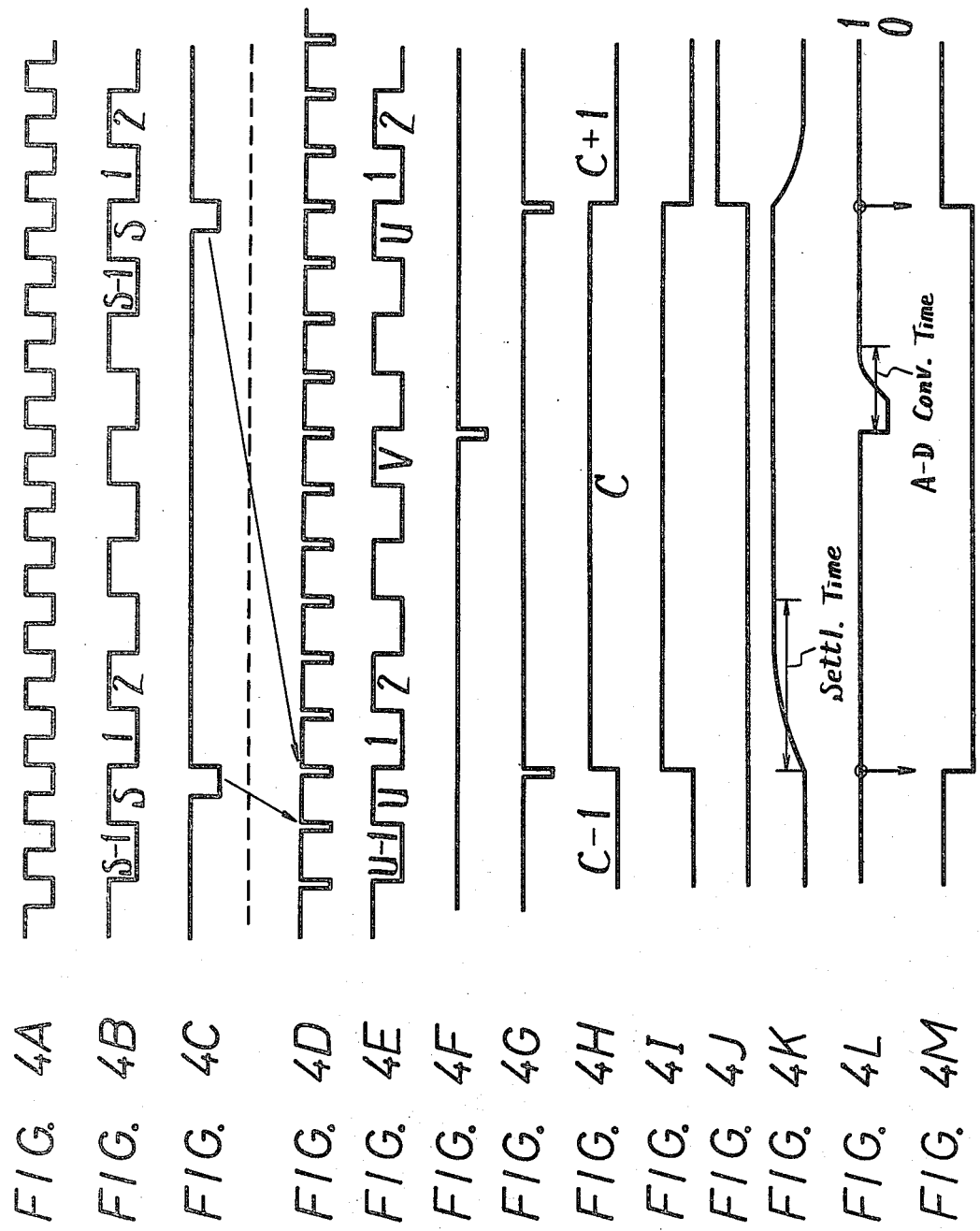

FIG. 7A
FIG. 7B
FIG. 7C
FIG. 7D
FIG. 7E
FIG. 7F
FIG. 7G
FIG. 7H
FIG. 7I
FIG. 7J
FIG. 7K

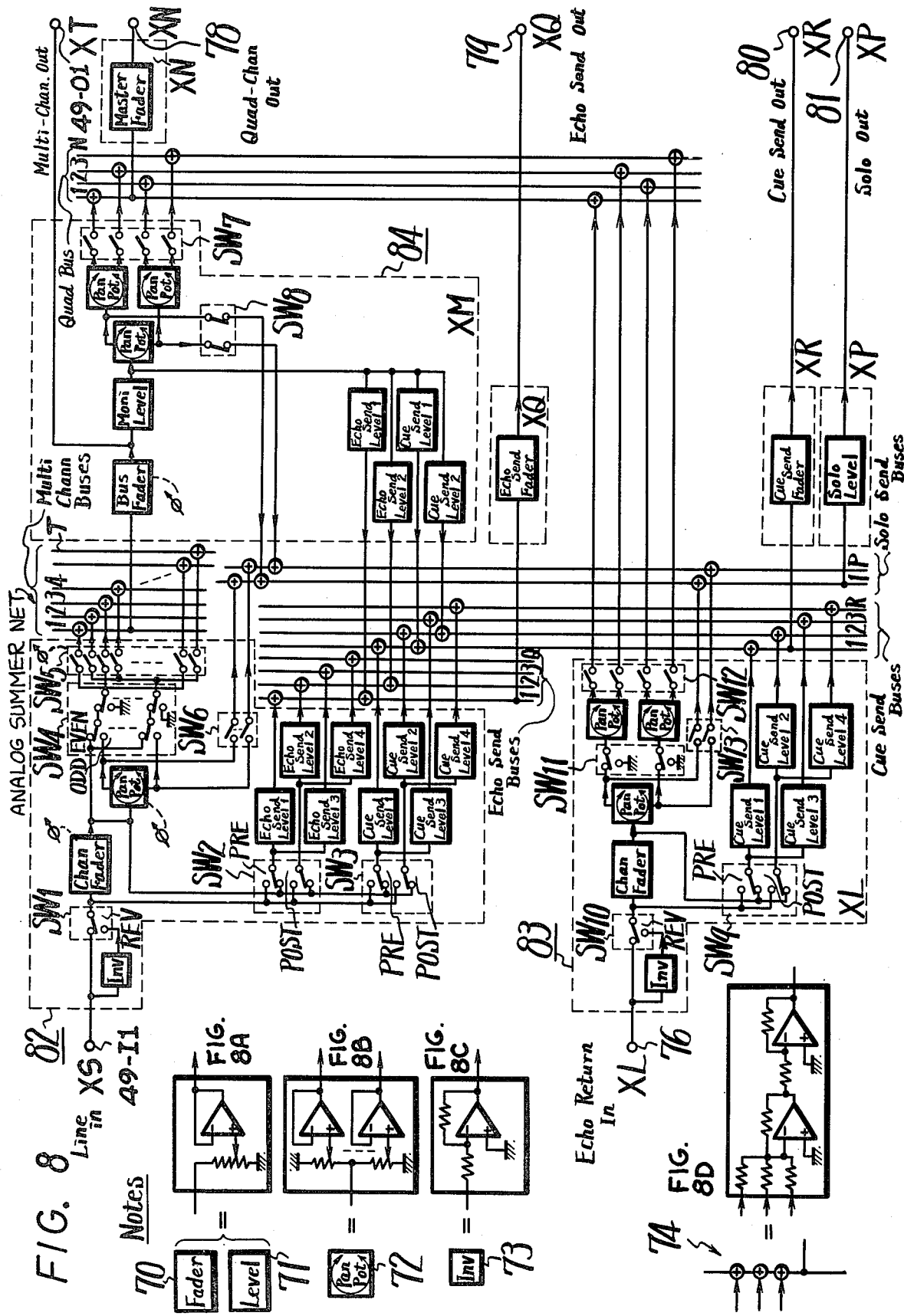

MIXING APPARATUS

BACKGROUND OF THE INVENTION

1. Field of the Invention

The present invention relates generally to apparatus for mixing audio signals, and particularly to apparatus for mixing digitalized audio signals.

2. Description of the Prior Art

There has hitherto been proposed a digital signal mixing apparatus as shown in FIG. 1, in which S-channels (where S is an integer) of digitalized audio signals are mixed at a desired mixing ratio to produce new digitalized audio signals in T channels (where T is also an integer).

In FIG. 1, S digital input channels are respectively supplied through input terminals 1 to digital-to-analog (D-A) converters 2 to produce plural-channel analog input signals. Other channels of analog signal, such as microphone signals, are supplied from respective input terminals 3 to amplifiers 4. Outputs of respective D-A converters 2 and amplifiers 4 are selectively changed over by respective change-over switches 5 and fed to corresponding analog tone control circuits 6. Outputs of these tone control circuits 6 are then applied to an analog signal mixing circuit 7. Mixed outputs of the analog signal mixing circuit 7 are partially fed to an analog echo adding device 11 and its outputs are supplied through switches 5' and further through other tone control circuits 6 to the analog signal mixing circuit 7. T-channels of analog output signals from the mixing circuit 7 are respectively supplied to analog-to-digital (A-D) converters 8 to obtain a plurality of digital output signals at respective output terminals 9. At output terminals 10 output analog signals can be directly obtained.

However, the above digital signal mixing apparatus has both following defects. Since the D-A converters and A-D converters are used in this apparatus, an undesirable amount quantization noise occurs in the outputs produced at terminals 9. Further, since the mixing is carried out in analog form, a distortion occurs based upon the non-linearity of the input-output characteristics of the analog signal mixing circuit. In addition, the analog signal mixing circuit is apt to be affected by external noise and hence such external noise is also mixed into its outputs.

SUMMARY OF THE INVENTION

A digital signal mixing apparatus mixes S input channels to form T output channels. Each channel is added to the other channels by a set of mixing factors stored as matrix elements in an S by T matrix memory. The mixing values are determined by manual adjustments of components in an Analog Mixer Network which adds corresponding scan pulses from a scan generator.

Each of the S input channels is fed sequentially to a set of multipliers as are the corresponding mixing factors, each multiplier feeding a corresponding accumulator which forms the respective output channel.

BRIEF DESCRIPTION OF THE DRAWINGS

FIG. 3 is a block diagram showing a practical construction of one part of FIG. 2;

FIGS. 4A to 4M are waveform diagrams used for explaining the invention;

FIGS. 7A to 7K are waveform diagrams used for explaining the invention; and

FIG. 8 is a block diagram showing a practical constructon of one part of FIG. 2.

DESCRIPTION OF THE PREFERRED EMBODIMENT

Figure 1:
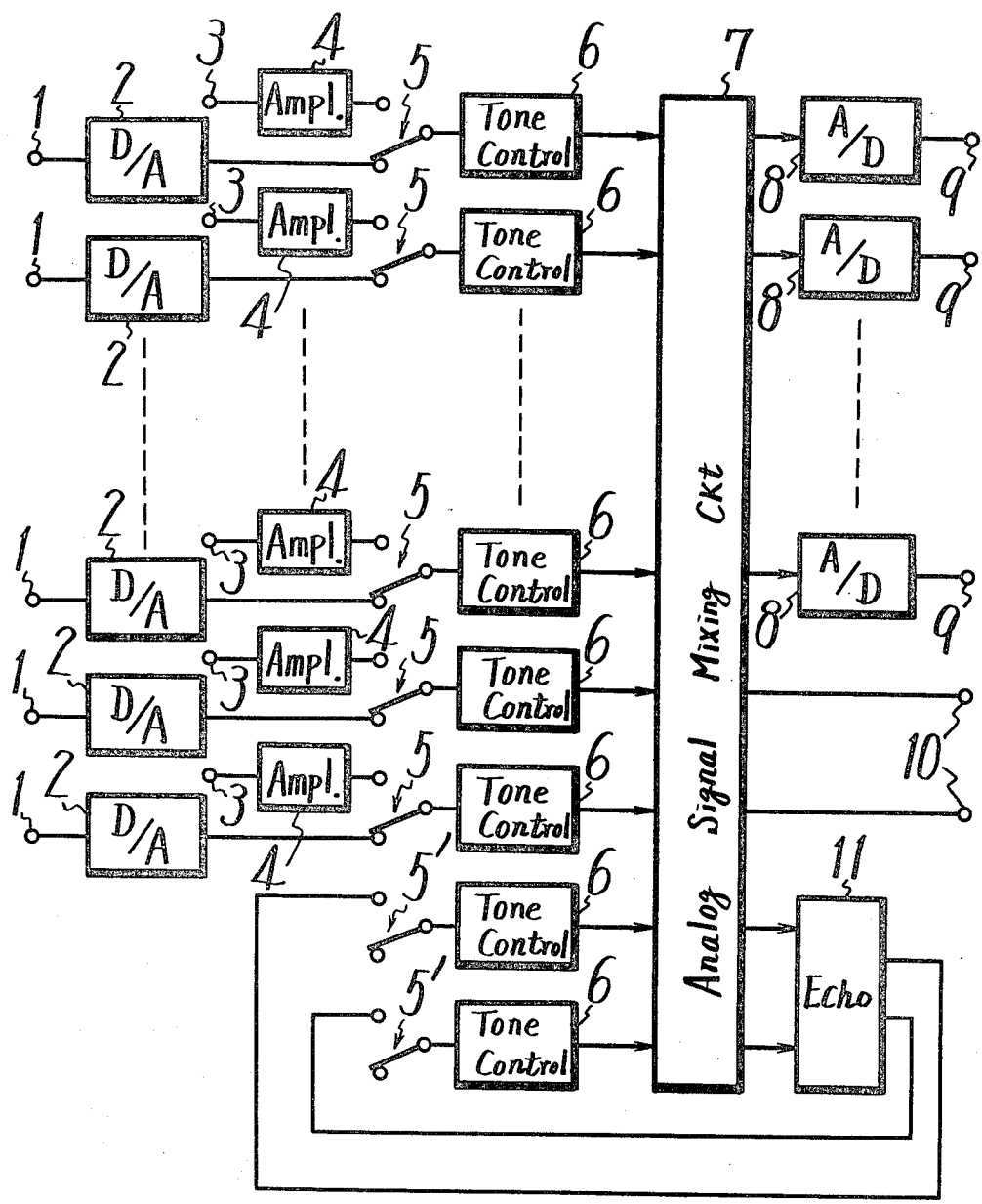
FIG. 1 is a block diagram showing a prior art digital signal mixing apparatus, which has been already explained.
Figure 2:
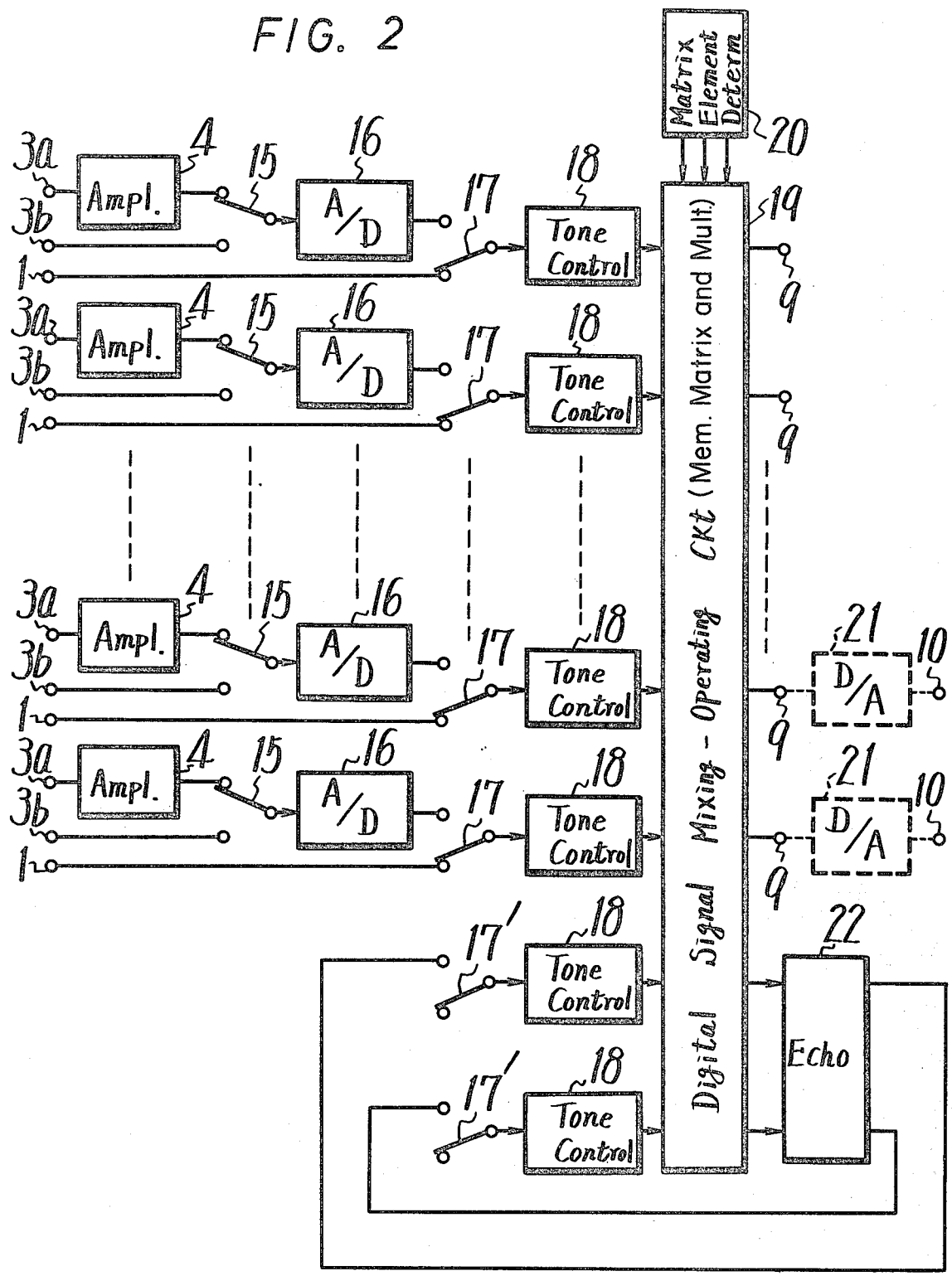
FIG. 2 is a block diagram showing one embodiment of this invention.

A description will hereinafter be given of one embodiment of this invention with reference to the drawings. FIG. 2 shows one embodiment of this invention, in which elements corresponding to those in FIG. 1 are indicated by the same reference numerals.

In FIG. 2, reference numerals 3a and 3b designate input terminals for a plurality of analog input signals, in which 3a designates microphone signal input terminals and 3b designates auxiliary input terminals. Reference numeral 4 indicates amplifiers for amplifying microphone signals. An amplified analog signal from an amplifier 4 and an input analog signal from an input terminal 3b are selected between by each change-over switch 15 and supplied to each sample-hold and A-D converter circuit 16. digital input signal from an input terminal 1 and a digital signal from an A-D converter circuit 16 are selected between by each change-over switch 17 and fed to a corresponding digital tone control circuit 18. The digital input signal appearing at the output of each tone control circuit 18 is supplied to a digital signal mixing and operating circuit 19 to produce an digital output signal, which is obtained at each output terminal 9. It is also possible that D-A converters 21 are connected to some of the output terminals 9 as shown by dotted lines to obtain analog output signals at output terminals 10.

Further, some of the digital output signals of the digital signal mixing and operating circuit 19 are supplied to a digital echo adding device 22 and outputs therefrom are fed through respective switches 17' and tone control circuits 18 to the digital signal mixing and operating circuit 19.

The digital signal mixing and operating circuit 19 is adapted to mix S channels of digital input signal to obtain T-channels of digital output signal. This mixing and operating circuit 19, as shown in greater detail in FIG. 3, is provided with a digital memory 27 for storing a matrix of S columns by T rows of in digital form, which will be described later in detail referring to FIG. 3. Reference numeral 20 denotes a matrix element determining circuit for determining the value of the matrix elements that are to be stored in the memory 27 in response to a desired mixing ratio of the S digital input channels. The digital signal mixing and operating circuit 19 is further provided with a matrix operating circuit 67 (shown in FIG. 3) for multiplying the digital signals in each of the S input channels by a corresponding column of matrix elements read out from the digital memory 27.

The digital tone control circuit 18 is well known, and when cutoff frequencies of, for example, low cut, high cut, base, treble and presence are designated, various frequency-output level characteristic curves can be obtained.

Next, the digital signal mixing and operating circuit 19 and the matrix element determining circuit 20 will be described with reference to FIG. 3. The matrix element determining circuit 20 is provided with an analog signal mixing circuit 49, in which S channels of analog input signals are fed to its input terminals (49-I1) through (49-IS) to obtain T channels of analog output signals with a desired mixing ratio at its output terminals (49-O1) through (49-OT). One example of the analog signal mixing circuit 49 is shown in FIG. 8 which will be described later. In this invention, the analog signal mixing circuit 49 is considered as a black box, and the relation between its analog input signals $VI_1$ to $VI_S$ and its analog output signals $VO_1$ to $VO_T$ is expressed by a determinant as follows:

$$\begin{bmatrix} VO_1 \\ VO_2 \\ \cdot \\ \cdot \\ VO_T \end{bmatrix} = [A] \begin{bmatrix} VI_1 \\ VI_2 \\ \cdot \\ \cdot \\ VI_S \end{bmatrix} \quad (1)$$

where [A] is a matrix showing the characteristics of the mixing circuit 49 expressed as follows:

$$[A] = \begin{bmatrix} A_{1,1} & A_{1,2} & \ldots & A_{1,S} \\ A_{2,1} & A_{2,2} & \ldots & A_{2,S} \\ \cdot & \cdot & & \cdot \\ \cdot & \cdot & & \cdot \\ A_{T,1} & A_{T,2} & & A_{T,S} \end{bmatrix} \quad (2)$$

In the case that there are input offset and temperature drift, the analog output voltages are taken as $VO_1{'}$ to $VO_T{'}$ when the analog input signals $VI_1$ to $VI_S$ are all made zero volt, and above equation (1) may be set as follows:

$$\begin{bmatrix} VO_1 - VO_1{'} \\ VO_2 - VO_2{'} \\ \cdot \\ \cdot \\ VO_T - VO_T{'} \end{bmatrix} = [A] \begin{bmatrix} VI_1 \\ VI_2 \\ \cdot \\ \cdot \\ VI_S \end{bmatrix} \quad (3)$$

However, the equation (1) will be adopted in this description for the sake of brevity.

It will be understood that in order to learn the values of each of the S×T elements of the matrix [A] it is sufficient to measure the analog output voltages $VO_1$ to $VO_T$ produced when each of the analog input signals $VI_1$ to $VI_S$ is held, in turn, at a reference voltage while all of the other analog input signals are grounded. An analog voltage proportional to the value of each element of this matrix [A] can be obtained in this way and can be converted into a digital signal, which is then supplied to the digital memory 27 for storage therein.

In the matrix element determining circuit 20 of FIG. 3, reference numeral 48 represents a drive circuit for driving the analog signal mixing circuit 49. In this drive circuit 48, respective driving circuits, each as illustrated, are provided between input terminals (48-I1) to (48-IS) and output terminals (48-O1) to (48-OS). These driving circuits are each composed of, for example, MOS type field effect transistors $Q_1$ and $Q_2$ and an inverter 66, so that the output terminals (49-O1) to (48-OS) may deliver either a voltage of one volt from a power supply +B or a voltage of ground potential, that is, zero volts, in response to "1" or "0" respectively fed to the input terminals (48-I1) to (48-IS). In other words, if the input signal is "1", the transistor $Q_1$ is turned on and the transistor $Q_2$ is turned off to deliver the voltage of one volt, while if the input signal is "0", the transistor $Q_1$ is turned off and the transistor $Q_2$ is turned on to deliver the voltage of zero volts.

Reference numeral 47 designates a scanning pulse generator (decoder), which is driven by the count value of a counter 43 to repeatedly sequentially produce an output "1" at its output terminals (47-O1) to (47-OS). An output obtained at any output terminal (47-OC), ranging from (47-O1) to (47-OS), will be applied to a corresponding input terminal (48-IC+1), ranging from (48-I2) to (48-IS) respectively, of the drive circuit 48.

Reference numeral 50 indicates an A-D converter circuit of, for example, 12 bits. This converter circuit 50 consists of T A-D converters (50-1) to (50-T), which are respectively connected to the output terminals (49-O1) to (49-OT) of the analog signal mixing circuit 49. Reference numeral 51 designates a latch circuitry supplied with the output of the A-D converter circuit 50. The latch circuitry 51 is composed of T latch circuits (51-1) to (51-T) respectively, corresponding to the A-D converters (50-1) to (50-T). Output terminals (52-1) to (52-T) of the latch circuitry 51 are provided as the output terminals of the matrix element determining circuit 20.

A clock pulse generating circuit 68 will next be described. A clock pulse from this circuit 68 is utilized not only in the matrix element determining circuit 20 but also in the digital signal mixing and operating circuit 19.

In this clock pulse generating circuit 68, reference numeral 40 denotes a master oscillator which generates a rectangular wave clock pulse (first clock pulse) of, for example, 2 MHz having a duty cycle of 50% as shown in FIG. 4A. The first clock pulse is supplied to an S-order (for example, S=40) counter 41, wherein it is counted as 1, 2, ..., S, as shown in FIG. 4B, and a second clock pulse having, for example, a frequency of 50 KHz, as shown in FIG. 4C is produced every time S is counted by counter 41. This second clock pulse is again shown in FIG. 4D at a reduced time scale. The second clock pulse is supplied to a U-order (for example, U=50) counter 42, wherein it is counted as 1, 2 ..., U, as shown in FIG. 4E, and a third clock pulse having a frequency of, for example, 1 KHz, as shown in FIG. 4G, is derived therefrom every time U is counted. This third clock pulse is fed to an S-order (S=40) counter 43, wherein it is counted as ... C-1, C, C+1, ..., as shown in FIG. 4H.

FIGS. 4I and 4J show waveforms of input voltages to the input terminals (49-I(C+1)) and (49-I(C+2)) of the analog signal mixing circuit 49, and FIG. 4K shows a waveform of an output voltage of the analog signal mixing circuit 49 at its output terminal (49-O(C+1)). This voltage reaches a constant value in a predetermined settling time $t_i$ after the input voltage fed to the input terminal (49-I(C+1)) has risen up as shown in FIG. 4I. FIG. 4L shows an output of the A-D converter (50-(C+1)). In this case, an output of the counter 42 is applied to a decoder 44, and when V (1<V<U) is counted during the counting of 1 through U by the counter 42, the decoder 44 delivers a start pulse as shown in FIG. 4F. This start pulse is supplied to the A-D converter circuit 50 to perform A-D conversion. Further, the third clock pulse (FIG. 4G) is supplied from the counter 42 to the latch circuitry 51 so that contents of the A-D converter circuit 50 are latched by the latch circuitry 51 at a timing of the third clock pulse as shown in FIG. 4M. It should be noted that the output (47-OC) is applied to the input (48-IC+1) to compensate for the fact that the column of T matrix values stored in the latch circuitry 51 during the existence of any given count value (C+1) in the counter 43 is the column of output values produced by the A-D converter circuit 50 during the existence of the previous count value (C).

When the input terminals (49-I1) to (49-IS) of the analog signal mixing circuit 49 are supplied in turn with a voltage of one volt, the elements of matrix [A] are converted into digital signals by the A-D converter 50 and latched in the latch circuitry 51 a column at a time. A processing time of this one cycle is as short as 40 milli seconds (m sec) after manual adjustment of the analog signal mixing circuit 49.

The contents of the latch circuitry 51 are supplied to the digital memory 27 of the digital signal mixing and operating circuit 19. The digital memory 27 consists of T S-stage shift registers (27-1) to (27-T) having input terminals (27-I1) to (27-IT) and output terminals (27-O1) to (27-OT), respectively. Each stage of each of these shift registers (27-1) to (27-T) is capable of storing a digital value which constitutes one element of the S column by T row matrix held in memory 27. The digital memory 27 is controlled by the first clock pulse from the master oscillator 40.

The T outputs of the latch circuitry 51 of the matrix element determining circuit 20 are supplied through a write logic control circuitry 53, consisting of write logic control circuits (53-1) to (53-T), to the respective input terminals (27-I1) to (27-IT) of the digital memory 27. The write logic control circuits (53-1) to (53-T) are the same in construction, so that the write logic control circuit (53-1) can be described as an example of the remaining write logic control circuits.

In a subtracter 54 of the write logic control circuit (53-1), an output of the shift register (27-1) of the digital memory 27 is subtracted from the output of the latch circuit (51-1) and a difference output of the subtracter 54 is supplied to decoders 55 and 56. The decoders 55 and 56 are adapted to produce outputs when the output of the subtracter 54 is +1 and −1, respectively. Respective outputs of the decoders 55 and 56 are supplied to an OR circuit 57 and its output is fed through an inverter 58 to an AND circuit 59. While, in the matrix element determining circuit 20, respective count values from the counters 41 and 43 are supplied to an exclusive OR circuit 45 and its output is applied through an inverter 46 to the AND circuit 59. Then, the output of the latch circuit (51-1) and an output of the AND circuit 59 are fed to an AND circuit 60. The output of the digital memory 27 at its output terminal (27-O1) is fed to an AND circuit 62, while the output of the AND circuit 59 is applied through an inverter 61 to the AND circuit 62. Then, outputs of the AND circuits 60 and 62 are supplied through an OR circuit 63 to the input terminal (27-I1) of the shift register (27-1) of the digital memory 27.

Figure 5A:
FIGS. 5A to 5E are waveform diagrams used for explaining the invention.
Figure 5B:
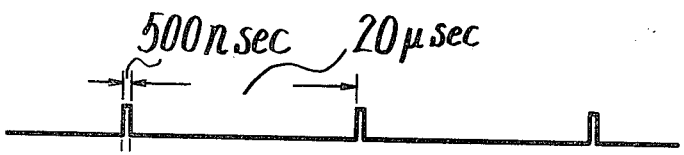
Figure 5C:
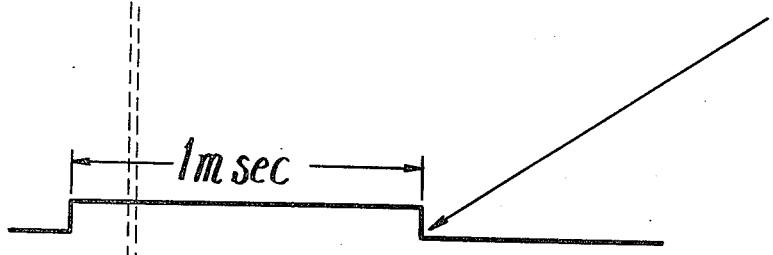
Figure 5D:
Figure 5E:
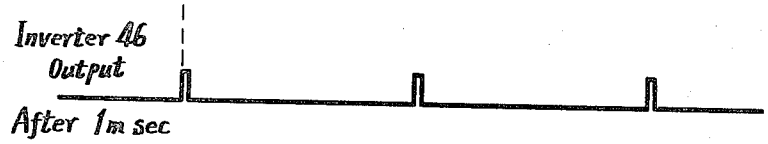

Next, the operation of the write logic control circuits (53-1), (53-2), . . . , (53-T) will be explained with reference to FIGS. 5A to 5E. The write logic control circuitry 53 is controlled by a pulse signal from the inverter 46, the input of which is connected with the exclusive OR circuit 45. The exclusive OR circuit 45 receives the count values of the counters 41 and 43 so as to generate the pulse signal once in every cycle of shifting the S matrix elements in each of the shift registers (27-1), (27-2), . . . , (27-T). Since the frequency of the master oscillator 40 is 2 MHz and the counters 41 and 43 are 1/40 frequency dividers, and the counter 42 is a 1/50 frequency divider the counters 41 and 43 produce 50 KHz and 25 Hz output signals, respectively. Therefore, one cycle of the counter 41 is 20 micro seconds ($\mu$sec), while one cycle of the counter 43 is 40 m sec. This means that the count value of the counter 41 changes every 500 nanoseconds (n sec) (=20$\mu$ sec/40) and that the count value of the counter 43 changes every 1 m sec (=40 m sec/40), as shown in FIGS. 5B and 5C. When the count value of the counter 41 coincides with the count value of the counter 43, a pulse signal indicating the coincidence condition between the counters 41 and 43 is obtained from the inverter 46. This occurs once every 20$\mu$ sec. The count value of the counter 43 changes once every 1 m sec, so that the pulse signals which are generated every 20 sec. is shifted by 500 n sec once every 1 m sec, as shown in FIGS. 5D and 5E. Assuming that 40 channels (S=40) of the digital input signals are converted to 30 channels (T=30) of the digital output signal, the memory 27 requires the capacity to store a matrix of 40 columns by 30 rows, or 1200 individual matrix elements. In this embodiment, each row [$A_{i1}$, $A_{i2}$, . . . , $A_{iS}$](i=1 to T) of the memory 27 comprises a shift register which is shifted by each clock signal from the master oscillator 40. Consequently, the matrix elements [$A_{i1}$, $A_{i2}$, . . . , $A_{iS}$] stored in the shift registers [27-1, 27-2, . . . , 27-T] can be circulated in 20$\mu$ sec. One column of matrix elements [$A_{1j}$, $A_{2j}$, . . . $A_{Tj}$] (j=1 to S) can be 27 read out from the T shift registers at a time, and this column of T matrix elements is supplied to the matrix operating circuit 67 to be multiplied by the value of a corresponding input channel and also to the write logic control circuit 53 to be rewritten back into the same column of the shift registers [27-1, 27-2, . . . , 27-T], unless the write logic control circuit 53 determines that the set of T valves stored in the latch circuit 51 should be written back into that column instead.

As explained later, the output of the inverter 58 is normally held at "1", so that the pulse signal supplied from the inverter 46 to the AND circuit 59 is fed to the AND circuit 60 as it is and through the inverter 61 to the AND circuit 62 in an inverted form. Therefore, the T outputs of the latch circuit 51 are normally supplied to the T input terminals [27-$I_1$, 27-$I_2$, . . . , 27-$I_T$] of the memory 27 at every pulse signal supplied to the write logic control circuit 53, and the T outputs of the T memory 27 are supplied to the input terminals of that memory in the remaining interval when no pulse signal is supplied to the write logic control circuit. It should be noted that since the memory 27 and the counter 41 are both driven by the clock signal from the master oscillator 40 and since the pulse signal is only produced from the inverter 46 when the count value in counters 41 and 46 are both equal to the same value j (j=1 to S), the timing when the pulse signal is produced from the inverter 46 coincides with the timing when the jth column of the memory 27 is read out from that memory. Furthermore, since the contents of the latch circuit 51 are renewed every 1 m sec, to equal the T values of the jth column of the matrix [A], where j is the count value of the counter 43, it follows that the contents of the latch circuit 51 correspond to the contents of the column of matrix elements which are read out from the memory 27 at the timing of the pulse signal supplied to the AND circuit 60. Therefore, when the pulse signal is supplied to the write logic control circuit 53, the contents of the latch circuit 51 are respectively applied to the input terminals of the memory 27 instead of the column elements read out from the memory 27. During those clock cycles from the master oscillator 40 when the pulse signal is not supplied to the circuit 53, the output of the inverter 61 is "1", so that the column elements read out from the memory 27 are directly supplied through the T AND circuit 62 and the OR circuit 63 to the T input terminals of the memory 27. This means that a given column of elements of the memory 27 can be rewritten from latch circuit 51 every 20 seconds for a duration of 1 m sec, and that all of the matrix elements of the memory 27 can be rewritten in 40 m sec.

Figure 6:
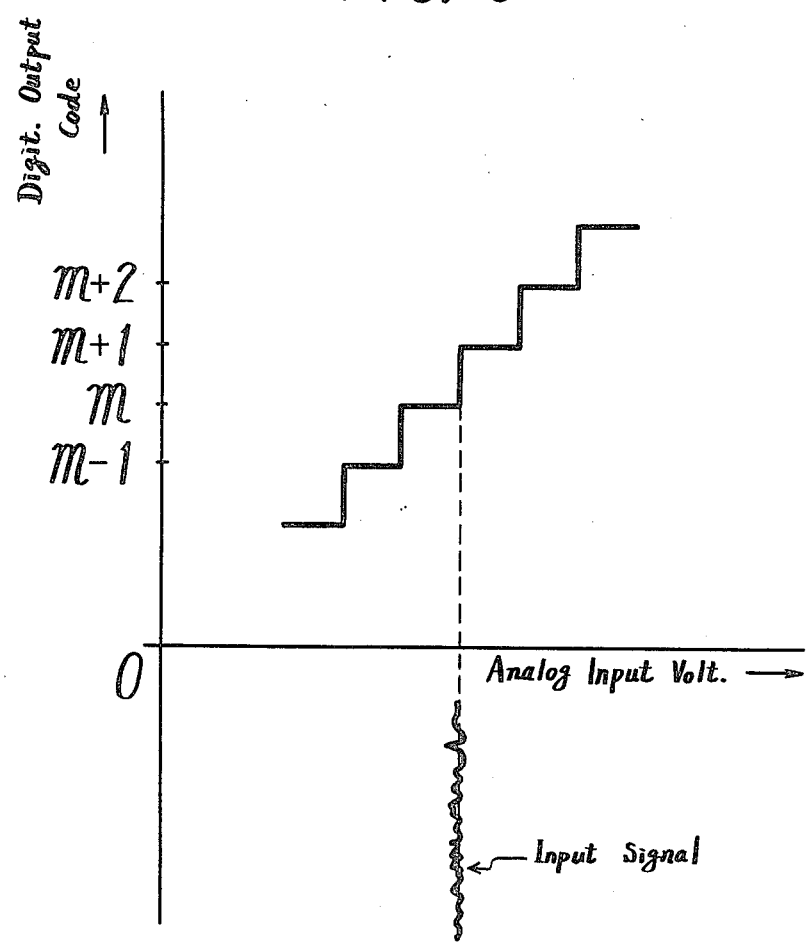
FIG. 6 is a graph showing a characteristic curve used for explaining the invention.

Further, the write logic control circuit 53 is provided with noise eliminating circuits which prevent the matrix elements of the memory 27 from being changed every time there is a small variation in the contents of the latch circuit 51. As described before, the output of the subtractor 54 is applied to the pair of decoders 55 and 56 which obtain the output "1" at the condition of the difference "+1" and "−1" in the least significant bit (LSB) between the latch output and the memory output, respectively. When the outputs of the decoders 55 or 56 are "1", the output of the inverter 58 becomes "0" and hence the pulse signal is not supplied to the AND circuit 60 and the outputs of the memory 27 are applied to the input terminals thereof. Therefore, even if the outputs of the latch circuits 51 fluctuate in their least significant bit owing to noise, the matrix elements of the memory 27 remain unaffected by such fluctuation. This noise protection is important since when an analog input voltage to the A-D converter circuit 50 is in the vicinity of a quantizing boundary voltage value as shown in FIG. 6, the digital output can be fluctuated between, for example, a code of m and a code of m+1, by a small amount of input noise, with the result that noise would be mixed into the digital output of the A-D converter circuit 50.

S digital input channels $CH_I$ to $CH_S$ as from tone control ciucits 18 in FIG. 2, each providing one 16-bit digital signal value in synchronism with each pulse of the second clock, are respectively supplied to input terminals (25-1) to (25-S) and then loaded respectively into one of S 16 bit registers (26-1) to (26-S) of load-shift register 26. This register 26 is shifted by the first clock pulse signal (FIG. 7A) from the master oscillator 40 to supply as an output the 16-bit digital signal value associated with one of the input channels $CH_I$ to $CH_S$ at every pulse of the first clock signal. While, the count values (FIG. 7B) of the counter 41 are supplied to a decoder 36, and when a code S is obtained at the counter 41, the decoder 36 delivers a detected signal (FIG. 7D) which is supplied to the register 26 as a load pulse (FIG. 7F). This detected signal from the decoder 36 is also fed to an inverter 37 and a phase-inverted signal (FIG. 7G) therefrom is supplied to the register 26 to prevent the shifting of register 26 while it is being loaded. FIG. 7C shows the second clock pulse from the counter 41.

Reference numeral 28 represents a multiplier circuit consisting of T 16-bit multipliers (28-1) to (28-T), to each of which the outputs (FIG. 7I) of one row of the digital memory 27 are sequentially supplied to be multiplied at the first clock rate by the corresponding outputs $CH_I$ to $CH_S$ (FIG. 7H) of the register 26. The 32-bit outputs of the multipliers (28-1) to (28-T) are respectively applied to adders (29-1) to (29-T) of a 32-bit adder circuit 29. The outputs of these adders (29-1) to (29-T) are then supplied to accumulators (33-1) to (33-T), respectively, of a 32-bit accumulator circuit 33. These accumulators (33-1) to (33-T) are controlled by the first clock pulse from the master oscillator 40. Outputs of these accumulators (33-1) to (33-T) are respectively fed to AND circuits (32-1) to (32-T) of an AND circuitry 32. While, the code of the counter 41 is fed to a decoder 30 to derive therefrom a detected signal (FIG. 7E) when the count value of "1" is obtained at the counter 41. This detected signal from the decoder 30 is supplied through an inverter 31 to the AND circuits (32-1) to (32-T) in common. Then, outputs of these AND circuits (32-1) to (32-T) are respectively supplied to the adders (29-1) to (29-T). AND circuitry 32 prevents totals accumulated in accumulators (33-1) to (33-T) during the multiplication of set of S input values $CH_I$ to $CH_S$ from being carried over into the multiplication of the next set of S such input values.

The upper 16 bits of the outputs (FIG. 7J) of the accumulators (33-1) to (33-T) are respectively applied to latch circuits (34-1) to (34-T) of a 16-bit latch circuitry 34 to obtain respective digital output signals (FIG. 7K) at output terminals (35-1) to (35-T) corresponding to the outputs at terminals 9 of FIG. 2. The latch circuits (34-1) to (34-T) are controlled by the first clock pulse from the master oscillator 40 and the output of the decoder 30.

The multiplier circuit 28, adder circuit 29, AND circuitry 32 and accumulator circuit 33 are associated to form the matrix operating circuit 67.

Next, one practical example of the analog signal mixing circuit 49 shown in FIG. 3 will be described with reference to FIG. 8. Since the analog signal mixing circuit of FIG. 8 is well known in construction, a only simple description of it will be given in connection with the embodiment of FIG. 3.

In FIG. 8A, reference numerals 70 and 71 designate a fader and level adjuster, in FIG. 8B 72 is a panoramic potentiometer, in FIG. 8C 73 is an inverter, and 74 a composer, each having the illustrated circuit construction as shown under the caption "Notes" in FIG. 8. Reference numerals 49-$I_I$ and 76 indicate input terminals of for analog input signals, respectively, consisting of S (=32) line signal input terminals 49-$I_i$, and L(=8) echo return signal input terminals 76. The echo return signals are output signals from an analog echo adding device (not shown) corresponding to the digital echo adding device 22 of FIG. 2. Reference numerals 49-$O_I$ and 78 to 81 represent output terminals for the analog output signals, respectively consisting of T(=24) multi-channel signal output terminals 49-$O_I$ . . . 49-$O_{24}$, N(=4) 4-channel signal output terminals 78, Q(=4) number of echo send signal (which is applied to the aforesaid analog echo adding device) output terminals 79, R(=4)'s number of cue send signal output terminals 80, and P(=2)'s number of solo signal output terminals 81. The cue send is used for sending a signal to a player's headphone and the like, and the solo is used for checking respective input and output signals, by way of example. Reference numeral 82 denotes S's number of input circuits respectively connected to the S's number of input terminals 49-$I_I$... 49-$I_K$, 83 L's number of input circuits respectively connected to the L's number of input terminal 76, and 84 T's number of output circuits. Reference characters $SW_1$ to $SW_{13}$ indicate change-over switches, in which $SW_1$ is a phase inverting change-over switch, $SW_2$ and $SW_3$ are pre-post change-over switches, $SW_4$ is a channel odd-even and channel muting switch, $SW_5$ is a bus selecting switch, $SW_6$ is a solo selecting switch, $SW_7$ is a 4-channel selecting switch, $SW_8$ is a solo selecting switch, $SW_9$ is a pre-post change-over switch, $SW_{10}$ is a phase inverting change-over switch, $SW_{11}$ is a channel muting switch, $SW_{12}$ is a channel selecting switch, and $SW_{13}$ is a solo selecting switch, respectively.

Having described a specific preferred embodiment of the invention with reference to the accompanying drawings, it is to be understood that the invention is not limited to that precise embodiment and that various changes and modifications may be effected therein by one skilled in the art without departing from the scope or spirit of the invention as defined in the appended claims.

We claim as our invention:

1. Apparatus for mixing digital signals in S input channels to obtain digital mixed signals in T output channels, where S and T are both integers, said apparatus comprising:

memory means for storing a matrix of S columns by T rows of matrix elements, each of said $S \times T$ matrix elements having a digital value;

matrix element determining means for determining the digital values of said $S \times T$ matrix elements in response to a desired mixing ratio between each of said S separate input channels and each of said T separate output channels, so that each column of said matrix corresponds to one of said S input channels and each row of said matrix corresponds to one of said T output channels;

matrix element supplying means for supplying said digital values of said matrix elements from said determining means to said memory means; and means for multiplying said digital signals in said S input channels by said matrix elements from said memory means, means for accumulating the multiplied signals, and means for latching the accumulated signals to obtain said T channels of digital output signals.

2. Apparatus according to claim 1, in which said conversion means includes T analog-to-digital converters to which said T analog outputs are respectively connected, each of said T analog-to-digital converters producing a digital output, and T latch circuits for latching respective digital outputs from said T analog-to-digital converters produced when said analog reference signal is supplied to one of said S analog inputs and for storing said digital outputs from said T analog-to-digital converters as digital values.

3. Apparatus according to claim 2, in which said sampling means includes

S driving circuits connected to said S analog inputs respectively, so as to sequentially supply said reference analog signal to each thereof, said driving circuits each having a voltage source providing a reference voltage level, and a gate circuit connected to said voltage source, and a scanning pulse generator for producing a scanning pulse which is sequentially supplied to each of said S gate circuits, so that said gate circuits sequentially connects said reference voltage level to each of said S analog inputs.

4. Apparatus according to claim 3, further comprising a clock pulse generating circuit having a master oscillator that produces an oscillating signal and at least a first and a second counter, said first counter frequency-dividing said oscillating signal to obtain an output signal for controlling said T analog-to-digital converters and said T latch circuits, and said second counter frequency dividing by S said output signal from said first counter to obtain an output signal for controlling said scanning pulse generator.

5. Apparatus according to claim 4, in which one column of T of said matrix elements is read out from said memory means at a time, in which one column of T of said matrix elements is read into said memory means at a time, and in which said matrix element supplying means includes a first gate means receiving a digital value from one of said latch circuits, a second gate means receiving a digital value of one of said T elements read out from said memory means, and controlling means for controlling said first and second gate means so that said digital value from said one of said latch circuits is read into said memory means when the contents of said one of said latch circuits correspond to a matrix element of the column of said matrix elements then being read into said memory means and such that said digital value from said memory means is read back into the corresponding matrix element of said memory means when the contents of said one of said latch circuits does not correspond to the column of said matrix elements then being read out from said memory means.

6. Apparatus according to claim 5, in which said controlling means is provided with a control pulse generator comprising a third counter frequency-dividing by S said oscillating signal from said master oscillator and means for detecting coincidence between the count of said second and third counters to generate a control pulse which makes said first gate means open and said second gate means closed.

7. Apparatus according to claim 6, in which said matrix element supplying means further comprises preventing means for preventing said control pulse from being supplied to said first and second gate means when the difference between said digital value from said one of said latch circuits and said digital value of one of said T elements read out from said memory means is less than a predetermined value.

8. Apparatus according to claim 7, in which said preventing means comprises a subtracter for subtracting said digital value from said one of said latch circuits from said digital value of said one of said T elements read out from said memory means and a third gate means connected between said means for detecting coincidence and said first and second gate means for preventing said control pulse from being supplied to said first and second gate means when the output of said subtracter is less than said predetermined value.

9. Apparatus according to claim 4, in which said memory means comprises T shift registers driven by said oscillating signal from said master oscillator, each of said shift registers having the capacity to hold S of said matrix elements of said memory means.

10. Apparatus according to claim 1, in which said multiplying means comprises T multipliers, each of which sequentially receives matrix elements from a given row of said memory means so that said T multipliers can sequentially multiply the digital value in each of said S separate input channels by each of the T matrix elements in that input channel's corresponding column of said matrix, each of said multipliers producing an output for each of the multiplications, and said means for accumulating being operative to separately accumulate the outputs of each of said T multipliers during the S multiplications of said input channels by their said corresponding column elements.

11. Apparatus according to claim 1, in which said matrix element determining means includes:
an analog signal mixing circuit having S analog inputs and T analog outputs for supplying an analog signal provided to any one of said S analog inputs to each of said T analog outputs in an amount selectable for each of said T analog outputs,
sampling means for sequentially supplying an analog reference signal to each of said analog inputs, and
conversion means for converting each of said T analog outputs to a corresponding digital value which corresponds to the digital value of one of said matrix elements.

* * * * *